United States Patent
Lin (10) Patent No.: US 7,613,087 B2
(45) Date of Patent: Nov. 3, 2009

(54) APPARATUS AND METHOD FOR ACCURATELY CONVERTING GROOVE/LAND POLARITY UPON GROOVE/LAND TRACK CHANGE ON OPTICAL MEDIUM

(75) Inventor: Meng-hsueh Lin, Banciao (TW)

(73) Assignee: MEDIATEK Inc., Hsin-Chu (TW)

( * ) Notice: Subject to any disclaimer, the term of this patent is extended or adjusted under 35 U.S.C. 154(b) by 579 days.

(21) Appl. No.: 11/398,512

(22) Filed: Apr. 5, 2006

(65) Prior Publication Data

US 2007/0091734 A1   Apr. 26, 2007

Related U.S. Application Data

(60) Provisional application No. 60/730,183, filed on Oct. 25, 2005.

(51) Int. Cl.
*G11B 27/36* (2006.01)
*G11B 20/10* (2006.01)

(52) U.S. Cl. ............... 369/47.23; 369/44.26; 369/53.2; 369/30.13; 369/53.37

(58) Field of Classification Search ............ 369/47.23, 369/44.26, 44.29, 47.27, 53.2, 275.3, 30.1, 369/30.13, 44.28, 53.37
See application file for complete search history.

(56) References Cited

U.S. PATENT DOCUMENTS 5,848,050 A * 12/1998 Nagasawa et al. ........ 369/275.4
5,867,474 A * 2/1999 Nagasawa et al. ........ 369/275.3
6,055,218 A    4/2000 Takeda et al.
6,088,307 A * 7/2000 Fushimi et al. ........... 369/44.13
6,091,678 A    7/2000 Fushimi et al.
6,091,699 A * 7/2000 Nakane et al. ............ 369/275.3
6,172,961 B1 * 1/2001 Tanoue et al. ............. 369/275.4
6,215,759 B1 * 4/2001 Tanoue et al. ............. 369/275.3
6,233,207 B1 * 5/2001 Tanaka .................... 369/44.26
6,259,658 B1 * 7/2001 Tanoue et al. ............. 369/44.29
6,298,033 B1 * 10/2001 Tanoue et al. ............. 369/275.3
6,333,902 B1   12/2001 Shim et al.

FOREIGN PATENT DOCUMENTS

CN        1233043 A       10/1999

* cited by examiner

*Primary Examiner*—Thang V Tran (57) ABSTRACT

The present invention discloses an apparatus and method for accurately converting a groove/land polarity upon a groove/land track change on an optical medium, by way of initially deciding a reference groove/land changing point or a decoded PID of any one specific sector formed on the optical medium. By counting a specific number of sectors from the reference groove/land changing point or the specific sector, a subsequent groove/land changing point will easily be approached for converting the groove/land polarity, and even the other oncoming track changing points on the optical medium also can be determined.

36 Claims, 8 Drawing Sheets

|  |  |  | Normal radius (min) | Number of Sectors per track | Number of tracks | Sector number (hex value) |
|---|---|---|---|---|---|---|
| Lead-In area | Embossed data zone | Initial zone | 22.59 max~23.996 | 18 | 1896 min | ~ 02 EFFF |
|  |  | Reference code zone |  |  |  | 02 F000 ~ 02 F00F |
|  |  | Buffer zone1 |  |  |  | 02 F010 ~ 02 F1FF |
|  |  | Control data zone |  |  |  | 02 F200 ~ 02 FDFF |
|  |  | Buffer zone2 |  |  |  | 02 FE00 ~ 02 FFFF |
|  | Mirror zone | Connection zone | 23.996 ~ 24.000 |  |  |  |
|  | Rewritable data zone | Guard track zone | 24.000 ~ 24.101 | 25 | 1568 | 03 0000 ~ 03 01FF |
|  |  | Disc test zone |  |  |  | 03 0200 ~ 03 05FF |
|  |  | Drive test zone |  |  |  | 03 0600 ~ 03 0CFF |
|  |  | Guard track zone |  |  |  | 03 0D00 ~ 03 0EFF |
|  |  | Disc identification zone |  |  |  | 03 0F00 ~ 03 0F7F |
|  |  | DMA1 & DMA2 |  |  |  | 03 0F80 ~ 03 0FFF |
| Data area (Rewritable data zone) |  | Zone0 | 24.101~24.964 | 25 |  | 03 1000 ~ 03 991F |
|  |  | Zone1 | 24.964~25.929 | 26 | 1568 | 03 9920 ~ 04 385F |
|  |  | Zone2 | 25.929~26.893 | 27 | 1568 | 04 3860 ~ 04 DDBF |
|  |  | Zone3 | 26.893~27.857 | 28 | 1568 | 04 DDC0 ~ 05 893F |
|  |  | Zone4 | 27.857~28.822 | 29 | 1568 | 05 8940 ~ 06 3ADF |
|  |  | Zone5 | 28.822~29.786 | 30 | 1568 | 06 3AE0 ~ 06 F29F |
|  |  | Zone6 | 29.786~30.750 | 31 | 1568 | 06 F2A0 ~ 07 B07F |
|  |  | Zone7 | 30.750~31.715 | 32 | 1568 | 07 B080 ~ 08 747F |
|  |  | Zone8 | 31.715~32.697 | 33 | 1568 | 08 7480 ~ 09 3E9F |
|  |  | Zone9 | 32.697~33.643 | 34 | 1568 | 09 3EA0 ~ 0A 0EDF |
|  |  | Zone10 | 33.643~34.608 | 35 | 1568 | 0A 0EE0 ~ 0A E53F |
|  |  | Zone11 | 34.608~35.572 | 36 | 1568 | 0A E540 ~ 0B C1BF |
|  |  | Zone12 | 35.572~36.536 | 37 | 1568 | 0B C1C0 ~ 0C A45F |
|  |  | Zone13 | 36.536~37.500 | 38 | 1568 | 0C A460 ~ 0D 8D1F |
|  |  | Zone14 | 37.500~38.465 | 39 | 1568 | 0D 8D20 ~ 0E 7BFF |
|  |  | Zone15 | 38.465~39.429 | 40 | 1568 | 0E 7C00 ~ 0F 70FF |
|  |  | Zone16 | 39.429~40.393 | 41 | 1568 | 0F 7100 ~ 10 6C1F |
|  |  | Zone17 | 40.393~41.358 | 42 | 1568 | 10 6C20 ~ 11 6D5F |
|  |  | Zone18 | 41.358~42.322 | 43 | 1568 | 11 6D60 ~ 12 74BF |
|  |  | Zone19 | 42.322~43.286 | 44 | 1568 | 12 74C0 ~ 13 823F |
|  |  | Zone20 | 43.286~44.251 | 45 | 1568 | 13 8240 ~ 14 95DF |
|  |  | Zone21 | 44.251~45.215 | 46 | 1568 | 14 95E0 ~ 15 AF9F |
|  |  | Zone22 | 45.215~46.179 | 47 | 1568 | 15 AFA0 ~ 16 CF7F |
|  |  | Zone23 | 46.179~47.144 | 48 | 1568 | 16 CF80 ~ 17 F57F |
|  |  | Zone24 | 47.144~48.108 | 49 | 1568 | 17 F580 ~ 19 219F |
|  |  | Zone25 | 48.108~49.072 | 50 | 1568 | 19 21A0 ~ 1A 53DF |
|  |  | Zone26 | 49.072~50.037 | 51 | 1568 | 1A 53E0 ~ 1B 8C3F |
|  |  | Zone27 | 50.037~51.001 | 52 | 1568 | 1B 8C40 ~ 1C CABF |
|  |  | Zone28 | 51.001~51.965 | 53 | 1568 | 1C CAC0 ~ 1E 0F5F |
|  |  | Zone29 | 51.965~52.930 | 54 | 1568 | 1E 0F60 ~ 1F 5A1F |
|  |  | Zone30 | 52.930~53.894 | 55 | 1568 | 1F 5A20 ~ 20 AAFF |
|  |  | Zone31 | 53.894~54.858 | 56 | 1568 | 20 AB00 ~ 22 01FF |
|  |  | Zone32 | 54.858~55.823 | 57 | 1568 | 22 0200 ~ 23 5F1F |
|  |  | Zone33 | 55.823~56.787 | 58 | 1568 | 23 5F20 ~ 04 C25F |
|  |  | Zone34 | 56.787~57.889 | 59 | 1792 | 24 C260 ~ 26 5F5F |
| Lead-out area (Rewritable data zone) |  | DMA3 & DMA4 | 57.889~58.493 | 59 | 982.5 | 26 5F60 ~ 26 601F |
|  |  | Disc identification zone |  |  |  | 26 6020 ~ 26 60DF |
|  |  | Guard track zone |  |  |  | 26 60E0 ~ 26 62DF |
|  |  | Drive test zone |  |  |  | 26 62E0 ~ 26 69DF |
|  |  | Disc test zone |  |  |  | 26 69E0 ~ 26 70DF |
|  |  | Guard Track zone |  |  |  | 26 70E0 ~ 27 41CF |

APPARATUS AND METHOD FOR ACCURATELY CONVERTING GROOVE/LAND POLARITY UPON GROOVE/LAND TRACK CHANGE ON OPTICAL MEDIUM

CROSS-REFERENCE TO RELATED APPLICATION

The present application claims the benefit of the filing date under 35 U.S.C. § 119(e) of a Provisional U.S. Patent Application No. 60/730,183, filed Oct. 25, 2005, which is incorporated by reference herein.

The present invention relates to an apparatus and method for accurately converting groove/land polarity, and especially in an apparatus and method capable of toggling a reliable and exact groove/land polarity upon determination of a groove/land track change on an optical medium.

Recently, various types of disk-shaped optical medium with high-density capacity was progressively developed in compliance with trends of accommodating huge amounts of digital contents, for instance, video or audio data. For one kind of disk-shaped optical medium such as DVD+RW, the data is recorded by a pickup head of a recording/reading device in grooves as pits formed on the surface of the optical medium. For another kind of disk-shaped optical medium such as DVD-RAM (Digital Versatile Disk-Random Access Memory), the data is successively allocated and recorded by a pickup head in both grooves and lands as different-layer pits formed on the surface of the optical medium. Such a groove/land track on the optical medium is divided into specific number of sectors each containing an embossed header data region and a user data region. The embossed header data region prerecords a physical identification data (PID) with reference to physical layout of the sector where the embossed header data region is located. Each sector owns its physical identification data (PID) independent of the other sectors. As soon as an alternation of land and groove tracks, i.e. a track changing position from a groove to a land or vice versa, is scanned by a beam spot of the pickup head during a reading/writing process on the optical medium, a track converting signal responsive to the track change is generated to enable a servo unit of the reading/writing device to toggle a groove/land polarity (phase) of an output control thereby reliably reading/writing data from or onto the optical medium.

Thus, it is a great topic of interest in how to accurately determine a groove/land changing position on the optical medium to ensure a stable servo control during each recording/reading process on the optical medium.

Figure 1A:
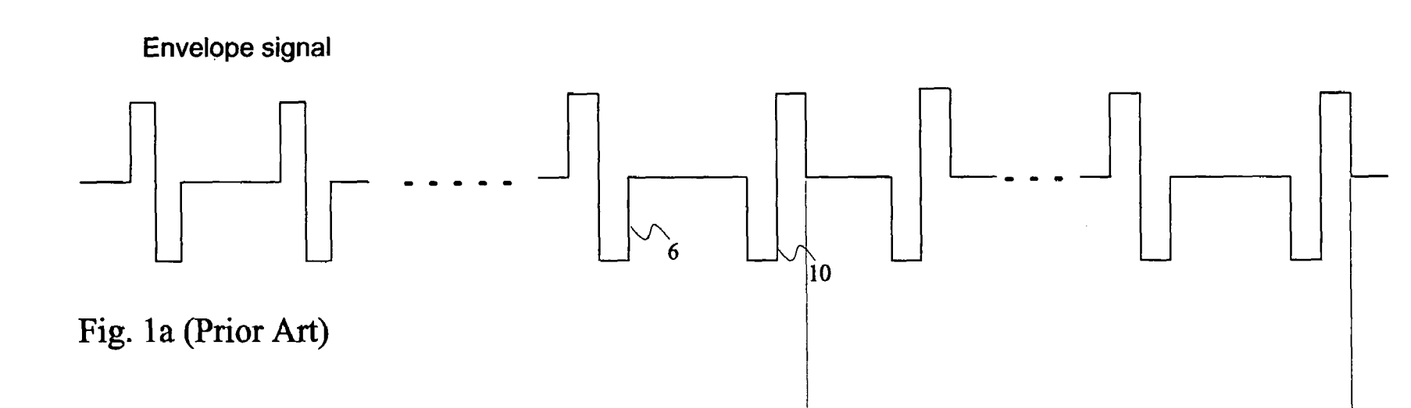
FIG. 1a is a schematic diagram showing a polarity variance of an envelope signal in accordance with a conventional track-polarity converting apparatus.
Figure 1B:
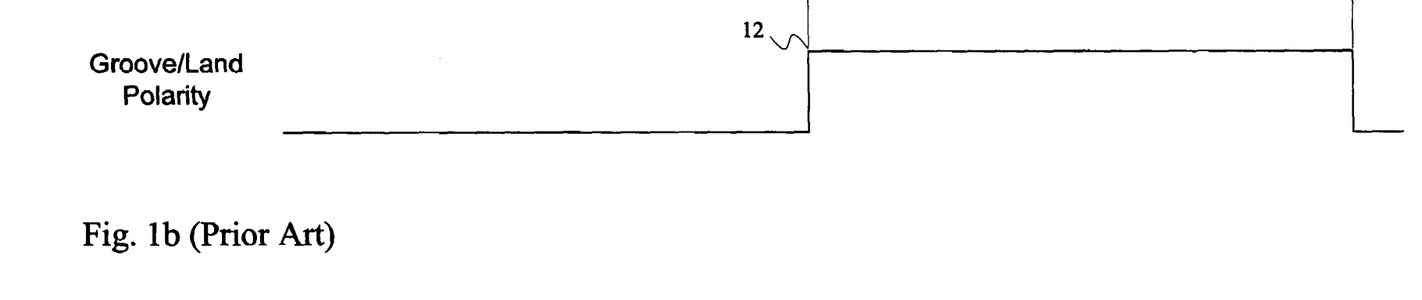
FIG. 1b is a schematic diagram showing a polarity variance of an output control for a groove/land track change on an optical medium.

A prior art disclosed in an U.S. Pat. No. 6,091,678 specifies that a tracking error signal (also called a "high frequency push-pull" or "HPP" signal) is generated to decide a polarity of the header field (plus or minus) responsive to a groove/land track change on an optical medium. Then a groove/land polarity toggle point 12 (as shown in FIG. 1b) will be determined upon occurrence of a phase difference resulted from the polarity change of an envelope signal. For example shown in FIG. 1a, a cycle 10 of an envelope signal has a 180-degree phase difference relative to the previous cycle 6. However, the envelope signal is often unstable to be detected during slice and therefore is insufficient to accurately determine the groove/land polarity toggle point.

Another prior art disclosed in an U.S. Pat. No. 6,333,902 specifies that a groove/land changing position can be determined by counting down a total number of sectors to find the last sector at an end of a track wherein the number of sectors can be counted by counting cycles of the wobble signal since the wobble exists in each sector. Alternatively, the U.S. Pat. No. 6,333,902 further specifies that a groove/land changing position can be determined by finding out a bit value of physical identification data relative to any one of the last 3 sequent sectors at an end of a track. However, as long as the physical identification data of the last 3 sectors in each track all fails to be decoded, the mechanism also fails to determine an exact groove/land changing position.

SUMMARY OF INVENTION

To address the foregoing drawbacks, it is, therefore, a primary objective of the present invention to provide an apparatus and method for accurately converting a groove/land polarity upon determination of a groove/land track change on an optical medium, which merely needs to initially find out a reference groove/land changing point on the optical medium, or pick up any one decoded physical identification data (PID) on the optical medium, and then is cable of timely and accurately determining the next groove/land changing points for converting groove/land polarity, even all of the next track changing points distributed on the optical medium, especially for one kind of optical medium which has to use an exact groove/land information to perform a stable servo control. Also, the present invention need not to decode the last sectors for finding out each one of the groove/land changing points on the optical medium.

To achieve the aforementioned objectives, a first embodiment of the present invention introduces an apparatus for accurately determining a groove/land polarity upon a groove/land track change on an optical medium, which includes a reference groove/land detector, a sector information unit, a sector counter, a comparator and a groove/land toggling unit. Meanwhile, the reference groove/land detector is operative to initially detect a reference groove/land changing point in a zone of the optical medium. The sector information unit as a lookup table pre-stores some sector information relative to the optical medium, thereby providing a first value indicating a total number of sectors per track based on to the detected zone on the optical medium. The sector counter is operative to count up a number of sectors per a predetermined cycle, from the reference groove/land changing point to approach a subsequent groove/land changing point along the track where the reference groove/land changing point belongs, and the number of sectors counted per cycle is set to be a second value. The comparator compares the first value with the second value to determine the subsequent groove/land changing point occurs on the optical medium or not. While the first value is found identical with the second value, the groove/land polarity conversion is performed at a header.

Furthermore, a method for accurately converting a groove/land polarity upon a groove/land track change on an optical medium is introduced as the following steps of:

detecting a reference groove/land changing point formed in a zone of the optical medium;

generating a first value indicating a total number of sectors per track according to the detected zone;

generating a second value by counting up a number of sectors per a predetermined cycle, from the reference groove/land changing point to approach a subsequent groove/land changing point along the track where the reference groove/land changing point belongs;

comparing the first value with the second value per the predetermined cycle;

determining the subsequent groove/land changing point to toggle a groove/land polarity when the first value is found identical with the second value; and After the subsequent groove/land changing point is determined, resetting the second value to zero for re-generating the second value per predetermined cycle by counting up the number of sectors until the other oncoming groove/land changing points are determined one by one.

Moreover, a second embodiment of the present invention introduces an apparatus for accurately converting a groove/land polarity upon a groove/land track change on an optical medium, comprising: a physical identification data (PID) detector, a sector information and calculation unit, a calculator, a comparator and a groove/land toggling unit. The PID decoder is operative to decode a specific physical identification value indicating physical layout of respective specific sector laid on the optical medium. The sector information and calculation unit further includes a lookup table and a remainder calculator. The lookup table provides an initial physical identification value representing a foremost sector in a zone where the specific sector belongs, and a first value indicating a total number of sectors per track with reference to said zone. The remainder calculator uses the initial physical identification value, the specific physical identification value, and the first value to calculate a corresponding remainder. The remainder denotes a number difference of sectors laid from the respective specific sector to approach a reference groove/land changing point along a track where the specific sector belongs, wherein the number difference of sectors per calculation can be set as a second value. If the PID detector cannot continuously detect a PID of a subsequent sector adjacent to the specific sector, the calculator will count up the remainder by adding one to re-generate a next second value responsive to the subsequent sector; otherwise the second value generated from the section information unit is reloaded directly for the subsequent sector. The comparator determines whether the second value (i.e. "R") is found identical with a difference value (i.e. "m−1") of subtracting one sector from the first value (i.e. "m") or a PID value of a last sector laid in the track. As soon as the second value (i.e. "R") is identical with a difference value (i.e. "m−1") of subtracting one sector from the first value (i.e. "m"), a subsequent groove/land changing point for converting the groove/land polarity is determined.

Beside, a method for accurately converting a groove/land polarity upon a groove/land track change on an optical medium is introduced as the following steps of:

(a) Decoding a specific PID number indicative of a specific sector formed on the optical medium;

(b) Depending upon a sector information relative to the optical medium where the specific PID number is includes, determining an initial PID number representing a foremost sector located in a zone where the specific sector belongs, and a first value indicating the total number of sectors per track with reference to said zone;

(c) According to the initial PID number, the specific PID number, and the first value, calculating a number difference of sectors laid from the specific sector to approach a reference groove/land changing point along a track where the specific sector belongs, wherein the number difference of sectors generated per calculation is set to be a second value;

(d) Comparing the first value with the second value per calculation to determine whether the second value (i.e. "R") is found identical with a difference value (i.e. "m−1") of subtracting one sector from the first value (i.e. "m"), or a PID value of a last sector laid in the track;

(e) If the second value is identical with the difference value of subtracting one sector from the first value, determining a subsequent groove/land changing point on the optical medium for converting a groove/land polarity;

(f) Returning to the step (a) for continuing to individually detect other subsequent sectors adjacent to the specific sector;

(g) If any one of the other subsequent sectors adjacent to the specific sector is detect continuously, returning to the step (d) for re-generating the second value relative to the detected subsequent sector; and (h) If any one of the other subsequent sectors adjacent to the specific sector cannot be detect continuously, counting up the second value by adding one to the previous remainder value and then returning to the step (d) for comparison.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 5 is a lookup table that predefines a physical relationship among a sector, track and zone on the optical medium;

DETAILED DESCRIPTION

Figure 2:
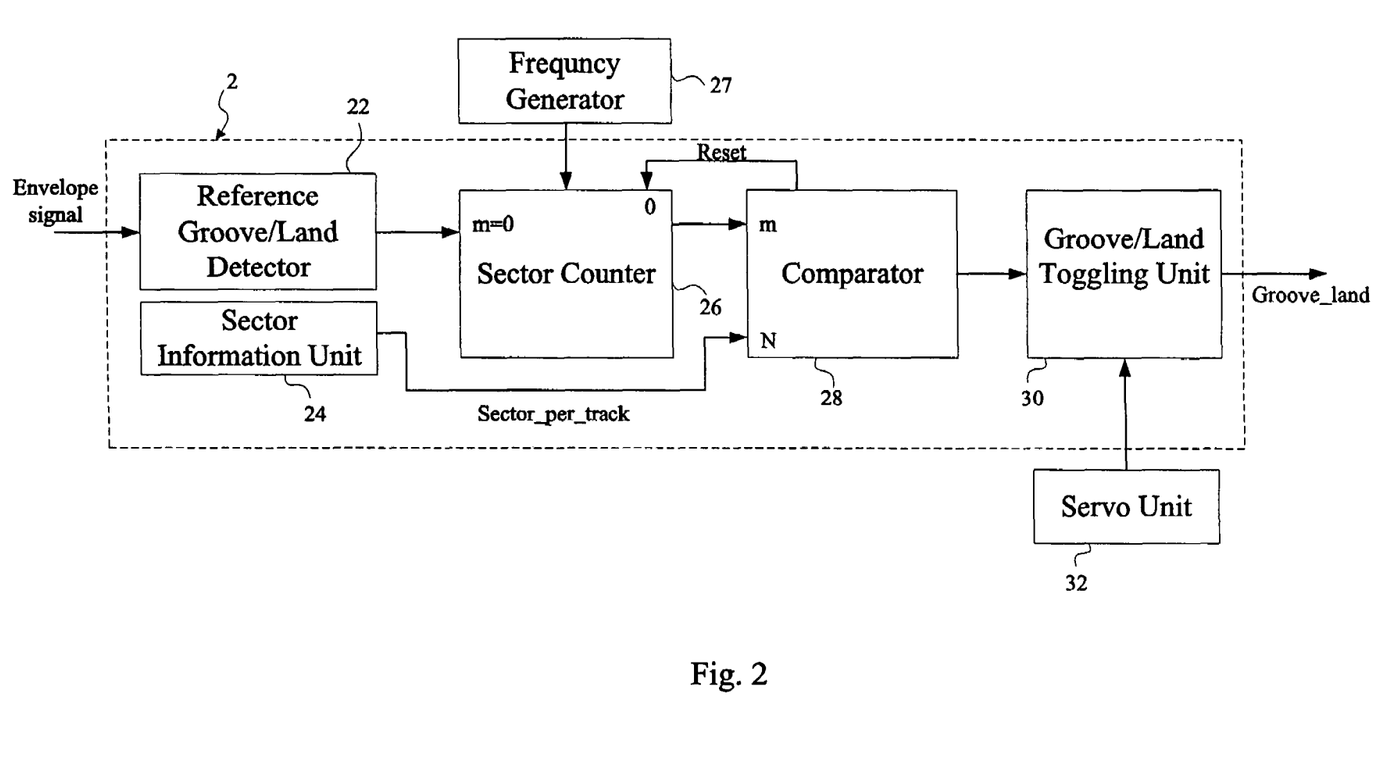
FIG. 2 is a block diagram of a track-polarity converting apparatus according to a first preferred embodiment of the present invention.

Referring to FIG. 2, a track-polarity converting apparatus 2 according to a first embodiment of the present invention for accurately converting a groove/land polarity responsive to a groove/land track change on an optical medium (not shown), comprises a reference groove/land detector 22, a sector information unit 24, a sector counter 26, a comparator 28 and a groove/land toggling unit 30. The reference groove/land detector 22 is operative to seek initially a reference groove/land changing point formed on the optical medium, depending upon a polarity change of an envelope signal as illustrated in FIG. 1a. In another case, a groove/land changing point also can be found by way of counting cycles of the wobble signal to acknowledge the number of sectors per track. As long as the reference groove/land changing point is found, the reference groove/land detector 22 will set a number value (i.e. "m") of sector as zero for beginning of the sector number counting (i.e. "m=m+1", detailed later) of the sector counter 26.

The sector information unit 24 provides the comparator 28 with a first value (i.e. "N") indicative of a total numbers of sectors per track, according to a zone where said reference groove/land changing point is located. The sector information unit 24 includes, for instance, a built-in lookup table, which pre-stores sequent physical identification data (PID) numbers indicative to physical layout of each sector formed on the optical medium. In another case for DVD-RAM, the total number value (i.e. "N") of sectors per track according to each different zone on the optical medium may be calculated with the sector information unit 24 using the following Equations (a) and (b).

$$\text{zone\_number} = \left\lfloor \frac{-686 + \sqrt{PID + 313,188}}{28} \right\rfloor \quad \text{Equation (a)}$$

Firstly, the sequent number (i.e. zone_number) of the zone where said reference groove/land changing point is located can be calculated by the Equation (a) with usage of the PID of said reference groove/land changing point. The operation of Equation (a) ranges from the zone 1 to zone 33 for a general rewritable optical disk, except the zone 0 and zone 34 that are not regular.

Then the total number (i.e. "N") of sectors per track can be achieved by the Equation (b), according to the zone number.

$$\text{Total number of sectors per track} = \text{zone\_number} + 25 \quad \text{Equation (b)}$$

Said total number (i.e. "N") of sectors per track is set to a first value for being supplied to the comparator 28.

After the reference groove/land changing point is found, the sector counter 26 counts up a number of sectors by adding one (i.e. m=m+1, "m" is the number of counted sectors and initially set to zero), laid from the reference groove/land changing point to approach a subsequent groove/land changing point, along the track where the reference groove/land changing point is located. The number of sectors per count from the reference groove/land changing point to approach the subsequent groove/land changing point is set to be a second value (as "m") output to the comparator 28. Each sector count employs a predetermined cycle derived from a frequency generator 27, such as a phase-locked loop (PLL) circuit that can lock a wobble signal frequency or an EFM (eight-to-fourteen modulation) signal frequency. In the other word, the number of sectors per count is re-generated by adding one sector to the previous second value.

The comparator 28 compares the first value (the total number of sectors per track, i.e. "N") with the second value (the number of sectors per count, i.e. "m") to check whether the first value is identical with the second value or not. If so, it represents that a sector which being counted is as an aftermost sector located at the end of the track, and neighbors on the subsequent groove/land track changing point formed on the optical medium. Based on the comparison result, the comparator 28 further outputs an enabling signal to the groove/land toggling unit 30 for determination of the subsequent groove/land changing point. Then the groove/land toggling unit 30 toggles the groove/land polarity in response to the subsequent groove/land changing point. When the first value is identical with the second value, the comparator 28 also reset the second value ("m") of the sector counter 26 to zero, and then the second value will be re-generated by re-counting a number of sectors from the subsequent groove/land changing point until the other oncoming groove/land changing points on the optical medium are found one by one. On the contrary, when the first value is not identical with the second value, the sector counter 26 would continue to count the number of sectors per cycle to output the second value until the first value is identical with the second value for determining the subsequent groove/land changing point.

The groove/land toggling unit 30 as an inversion circuit is operative to toggle a groove/land polarity on a header area of a foremost sector arranged in the subsequent groove/land change of the optical medium, via a servo unit 32 based on the enabling signal output from the comparator 28.

Figure 3:
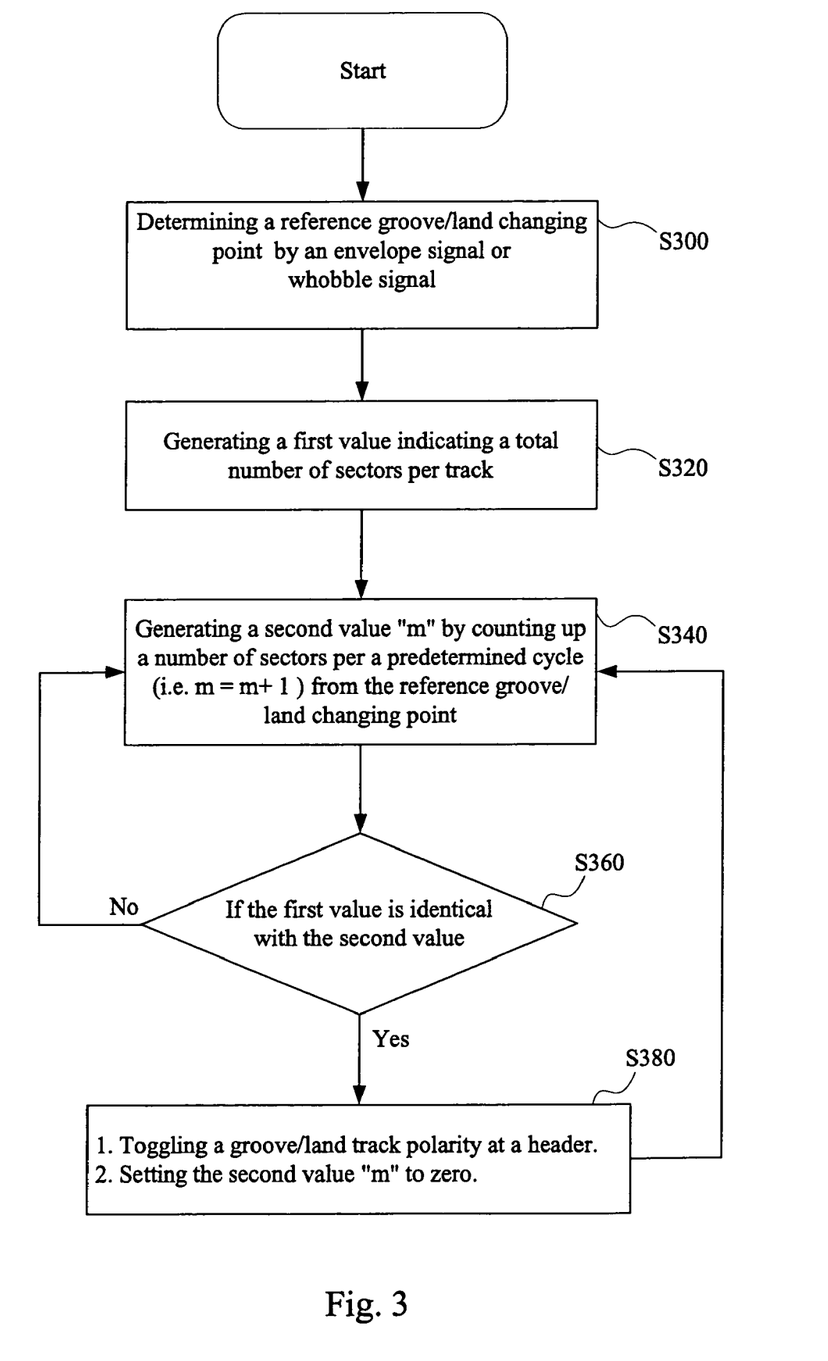
FIG. 3 is a flow chart of a track-polarity converting method according to the present invention.

Furthermore, a flow chart of a track-polarity converting method for accurately toggling a groove/land polarity upon a groove/land track change on an optical medium is presented in FIG. 3, and comprises the following steps of:

In step S300, initially detecting a reference groove/land changing point formed on a zone laid on the optical medium, by a phase difference of an envelope signal (as shown in of FIG. 1a); in another case, counting cycles of the wobble signal to find out a reference groove/land changing point;

In step S320, generating a first value (i.e. "N") indicating a total number of sectors per track according to the zone of the optical medium;

In step S340, generating a second value (i.e. "m") by counting up a number of sectors per a predetermined cycle, from the reference groove/land changing point to approach a subsequent groove/land changing point, along the track where the reference groove/land changing point is located, wherein for example, if "m" is the number of counted sectors (or the second value) and initially set to zero, an equation of "m=m+1" denotes that the number of sectors is counted per the predetermined cycle by adding one sector to the previous second value; and In step S360, comparing the first value with the second value to determine a subsequent groove/land changing point formed on the optical medium, wherein if the first value is identical with the second value, it represents that the sector which being counted is a last sector arranged at the other end of the track where the reference groove/land changing point is located and neighbors on the subsequent groove/land changing point, and therefore going to step S380; and otherwise returning to step S340 for re-generating the second value ("m=m+1") by adding one sector to the number of sectors until the first value is identical with the second value;

In step S380, generating a groove/land converting signal for toggling a groove/land track polarity at a header area in a first sector of the next track, and resetting the second value to zero (i.e. "m=0") and then returning to the step S340 for re-generating the second value per predetermined cycle by counting up the number of sectors from the determined subsequent groove/land changing point until each oncoming groove/land changing point formed on the optical medium is found out one by one.

Figure 4:
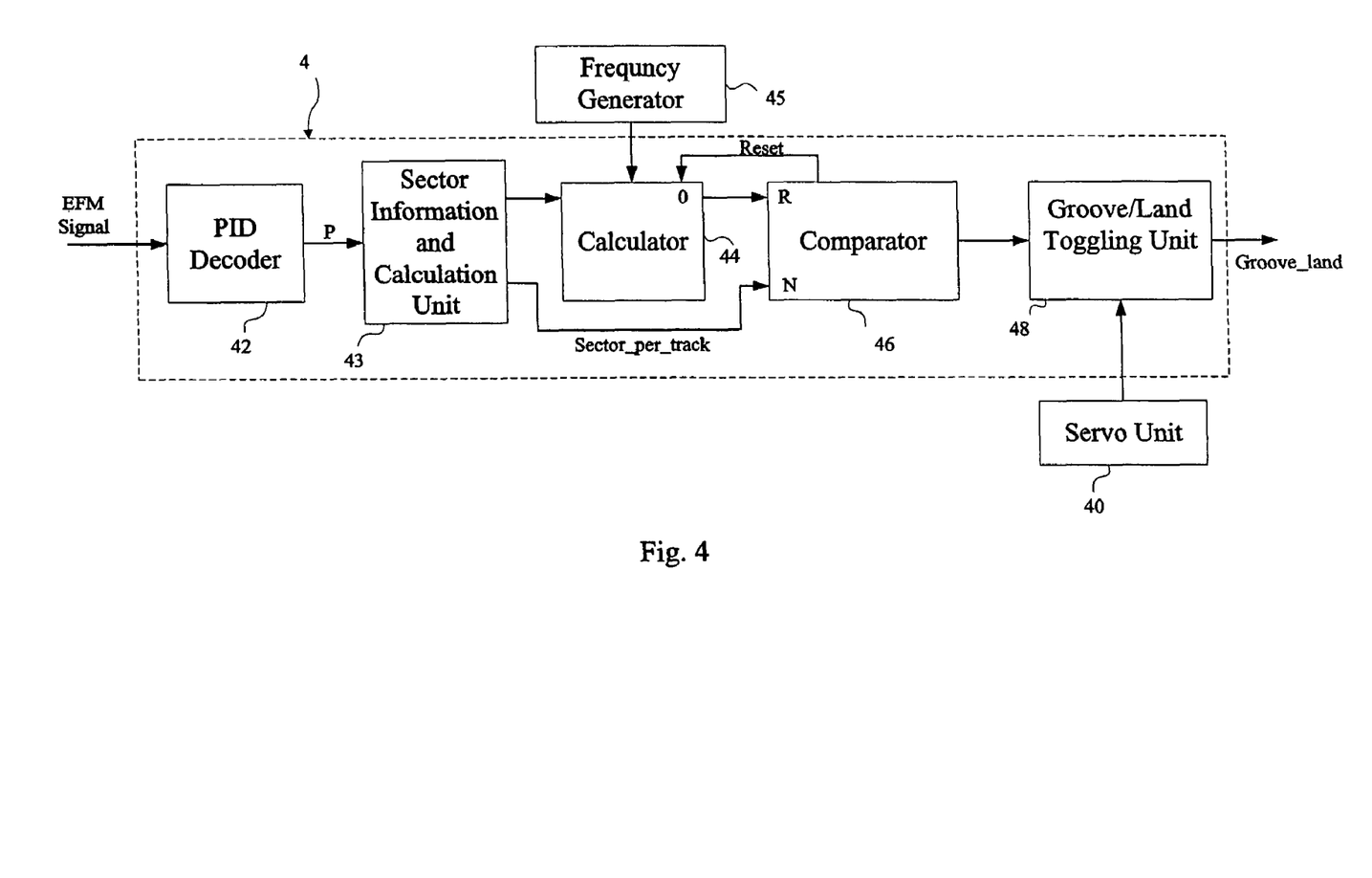
FIG. 4 is a block diagram of another track-polarity converting apparatus according to a second preferred embodiment of the present invention.

Further referring to FIG. 4, a track-polarity converting apparatus 4 according to a second preferred embodiment of the present invention for accurately converting groove/land polarity responsive to a groove/land track change on an optical medium, comprises a physical identification data (PID) detector 42, a sector information and calculation unit 43, a calculator 44, a comparator 46 and a groove/land toggling unit 48.

By a microprocessor (MCU) or a digital signal processing (DSP) unit, a tracking control is performed for any one specific sector laid on the optical medium. Under a tracking-on status, the PID decoder 42 may decode an EFM (eight-to-fourteen modulation) signal from each specific sector laid on the optical medium into a specific physical identification (PID) value (i.e. "P") indicating physical layout of the specific sector on the optical medium, and outputs the specific physical identification value (i.e. "P") to the sector information unit 43. If the specific sector fails to be decoded successfully, the PID decoder 42 still continuous to decode the next sector.

The sector information and calculation unit 43 includes a built-in lookup table and/or a remainder calculator. For a example, a lookup table for DVD-RAM shown in FIG. 5 pre-stores all sector information with regard to the optical medium, which predefines a physical relationship among sectors, tracks and zones laid on the optical medium, thereby determining an initial physical identification value (i.e. "N") representing a foremost sector laid on a zone where the specific sector is located by using the specific physical identification value (i.e. "P") to look up the table, and a first value (i.e. "m") indicating a total number of sectors per track with reference to the zone via the table. The remainder calculator uses the initial physical identification value (i.e. "N"), the specific physical identification value (i.e. "P"), and the first value (i.e. "m") to calculate a corresponding remainder as a second value (i.e. "R"), wherein the remainder denotes a number difference of sectors laid from the respective specific sector to approach a reference groove/land changing point along a track where the specific sector belongs. The number difference of sectors per calculation is set as a new second value (i.e. "R"). In another case, the sector information and calculation unit 43 may include a calculating circuit for calculating the total numbers of the sectors per track according to the zone where the specific sector belongs, by using the equations (a), (b) aforementioned in the first embodiment.

The remainder is calculated by using the first value (i.e. "m") to divide a number difference of sectors (i.e. "P–N") allocated between the specific physical identification value (i.e. "P") and the initial physical identification value (i.e. "N"). For an example shown in FIG. 6, each "K" represents a decoded specific sector, "P" represents the specific physical identification value ("$P_1$" denotes a next PID indicative to a sector neighboring on the specific sector), "N" represents the initial physical identification value, "m" represents the total number of sectors per track as the first value, and "R" represents a remainder value (as the number difference of sectors marked by a numerical reference 62) generated during calculation of a following equation (c) ("$R_1$" denotes a next remainder based on "$P_1$") wherein "MOD" represents a remainder mathematical function.

$$R=MOD((P-N), m) \qquad \text{equation (c)}$$

Figures 6A, 6B:
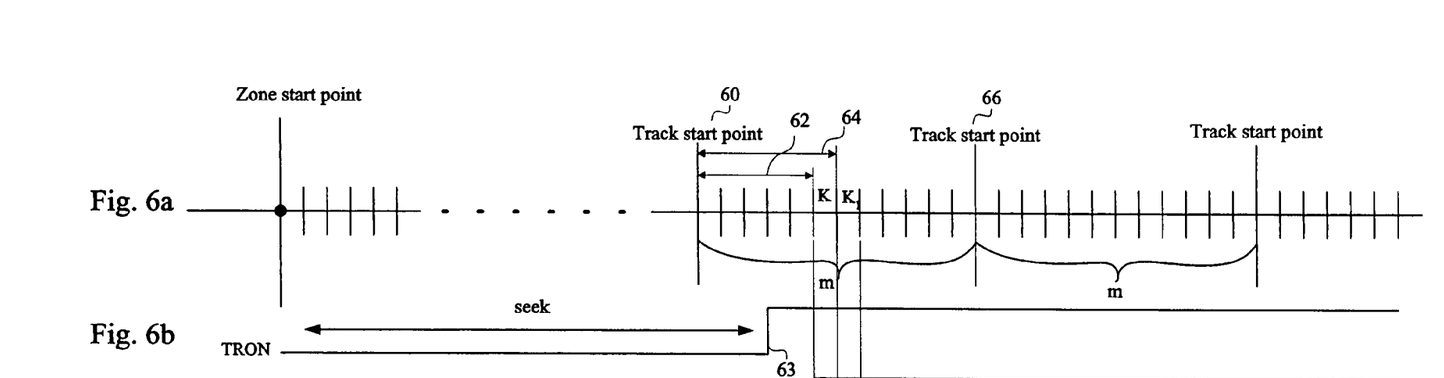
FIG. 6a is a schematic diagram showing a physical layout of sectors per track in a zone of the optical medium according to the second embodiment of the present invention.
FIG. 6b is a schematic diagram showing a tracking signal output upon a servo control on the optical medium according to the second embodiment of the present invention.
Figure 6C:
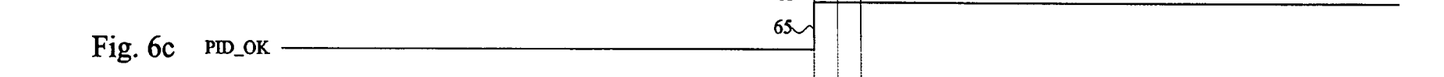
FIG. 6c is a schematic diagram showing a raising edge of a signal output of successfully decoding a specific physical identification value according to the second embodiment of the present invention.
Figure 6D:
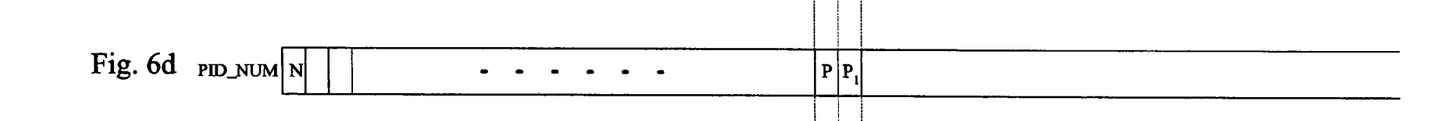
FIG. 6d is a schematic diagram showing each physical identification value relative to the corresponding sequent sector on the optical medium according to the second embodiment of the present invention.

Thus, it is apparent in FIG. 6a that if the sequent specific sectors (K, $K_1$, ...) within a track are successfully decoded by the PID decoder 42, the calculator 44 will generate different second values respectively responsive to the decoded different specific sectors (K, $K_1$, ...), which are progressively far away from the same reference groove/land changing point 60 laid on the track but approach a subsequent groove/land changing point 66.

Figure 7A:
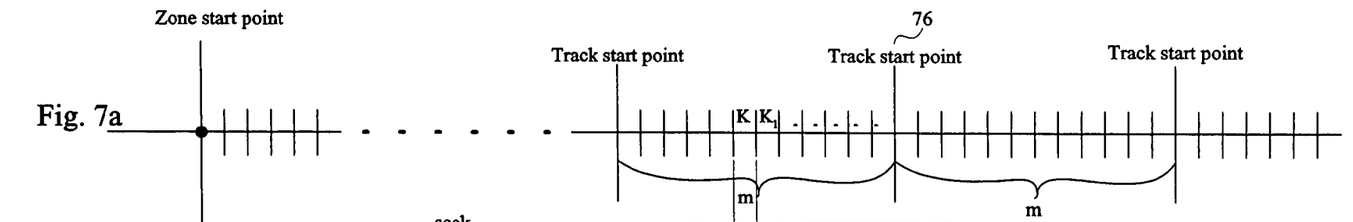
FIG. 7a is a schematic diagram showing a physical layout of sectors per track in a zone of the optical medium according to the second embodiment of the present invention.
Figures 7B, 7C:
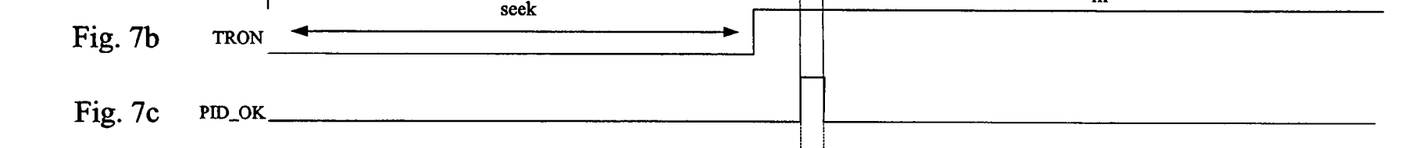
FIG. 7b is a schematic diagram showing a tracking signal output upon a servo control on the optical medium according to the present invention.
FIG. 7c is a schematic diagram showing only one specific sector, which is successfully decoded into a specific physical identification value according to the second embodiment of the present invention.
Figure 7D:
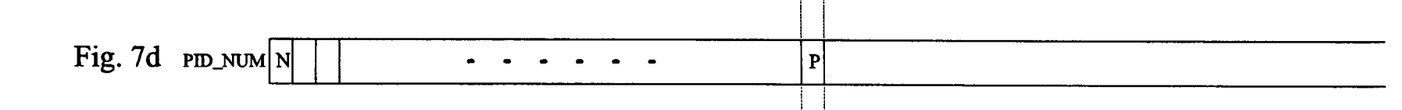
FIG. 7d is a schematic diagram showing only the physical identification value relative to the decoded sector according to the second embodiment of the present invention.

In another case shown in FIG. 7a, if any one of the sequent specific sectors (K, $K_1$, ...) fails to be decoded successfully, the calculator 44 will count up a new second value (R) relative to the decoded-fail specific sector by adding one to a previous second value (i.e. R=R+1).

Since the calculator 44 receives each second value ("R") generated from the sector information and calculation unit 43 to approach the reference groove/land changing point as a header area of a prima sector laid on a track where the specific sector belongs (detailed later). If the PID detector 42 successfully detects a PID of each specific sector, the calculator 44 will directly reload the second value ("R") generated from the section information and calculation unit 43 for the specific sector, and then provide the second value ("R") to the comparator 46.

Oppositely, if the PID detector 42 cannot continuously detect a PID of a subsequent sector adjacent to the specific sector, the calculator 44 will count up the remainder by adding one (i.e. "R=R+1") to re-generate a next second value ("R") responsive to the subsequent sector for supplying to the comparator 46. For more precious count, the remainder counting of the calculator 44 employs a predetermined cycle derived from a frequency generator 45, such as a phase-locked loop (PLL) circuit, which is synchronized with a wobble signal frequency or an EFM (eight-to-fourteen modulation) signal frequency.

The comparator 46 compares the first value with the second value per calculation to determine whether to enable the groove/land toggle unit 48 via the servo unit 40 to toggle a groove/land polarity in response to the subsequent groove/land changing point (as reference numeral 68 of FIG. 6f) on the optical medium. As soon as the second value is identical with a difference value of subtracting one from the first value (i.e. R=m–1), or with a PID value of a aftermost sector at an end of the track, it represents that the sector relative to the second value is the aftermost sector at an end of the track and is neighboring on the subsequent groove/land changing point. At this moment, the comparator 46 will enable the groove/land toggle unit 48 via the servo unit 40 to toggle a groove/land polarity in response to the subsequent groove/land changing point, and then reset the second value "R" of the counter 44 to zero. However, after the second value relative to the specific sector is compared with the first value, regardless of whether the second value is identical with the difference value of subtracting one sector from the first value (i.e. R=m–1) or not, at least one subsequent sector adjacent to the specific sector is individually decoded by the PID decoder 42 for re-generating the second value until each oncoming groove/land changing point on the optical medium is found out one by one.

The groove/land toggling unit 48 generates a groove/land converting signal based on the enabling signal from the comparator 46 to toggle a groove/land polarity for the groove/land track change on the optical medium.

Figure 8:
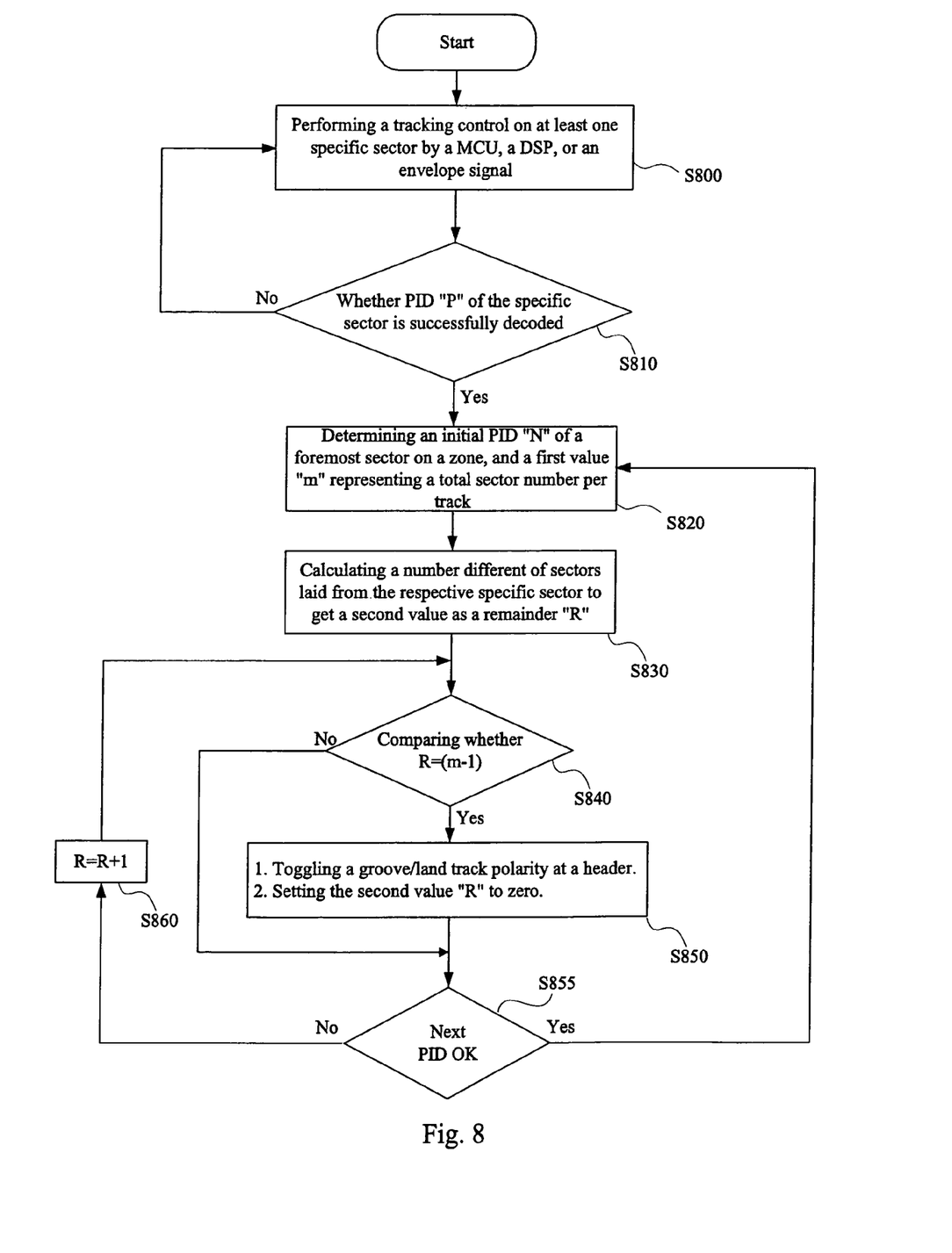
FIG. 8 is a flow chart illustrating another one track-polarity converting method according to the present invention.

Furthermore, a flow chart of a track-polarity converting method for accurately toggling a groove/land polarity upon a groove/land track change on an optical medium is presented in FIG. 8, and comprises the following steps of In step S800, performing a tracking control (as a numerical reference 63 shown in FIG. 6b) on at least one specific sector on the optical medium by, for example, a microprocessor, a digital signal process unit, or a utilization of a phase difference of an envelope signal (as shown in FIGS. 1a & 1b);

In step S810, determining whether a specific physical identification value (as a reference "P" shown in FIG. 6d) indicating the physical layout of the specific sector (as a reference "K" shown in FIG. 6a) laid on the optical medium is successfully decoded or not; if so, performing the next step S820; and otherwise, returning to the step S800 as restarting a tracking control on the next sector (as a reference "$K_1$" shown in FIG. 6a);

In step S820, determining an initial physical identification (PID) value (as a reference "N" shown in FIG. 6a) representing a foremost sector on a zone where the specific sector belongs, and a first value indicating a total number of sectors per track (as a reference "m" shown in FIG. 6a) with reference to the zone, by using the decoded specific physical identification value to look up a built-in table (as shown in FIG. 5) which predefines a physical relationship among each sector, track and zone laid on the optical medium, wherein the total number of sectors per track may be calculated by said equations (a) and (b) in reference to the zone where the specific sector belongs;.

Figure 6E:
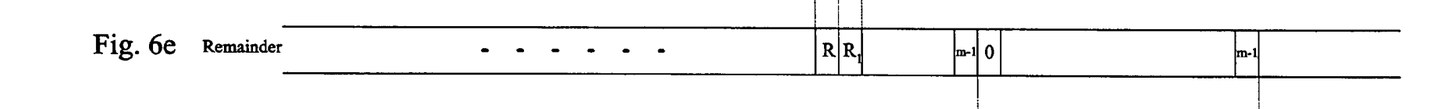
FIG. 6e is a schematic diagram showing each remainder value relative to the corresponding sequent sector according to the second embodiment of the present invention.
Figure 6F:
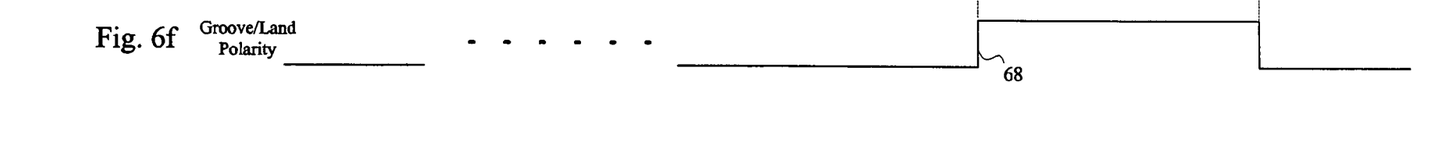
FIG. 6f is a schematic diagram showing a groove/land polarity conversion for a groove/land track change determined on the optical medium according to the second embodiment of the present invention.
Figure 7E:
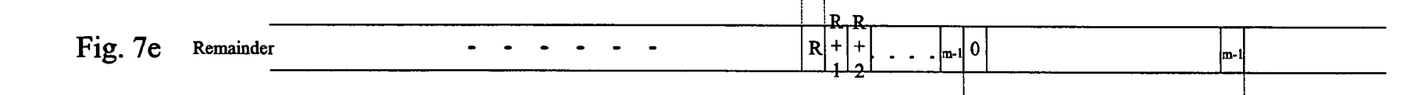
FIG. 7e is a schematic diagram showing each remainder value relative to the corresponding sequent sector, which is counted up by adding one sector to the previous remainder value, according to the second embodiment of the present invention.
Figure 7F:
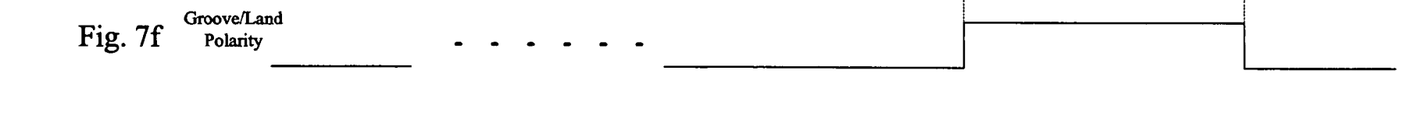
FIG. 7f is a schematic diagram showing a groove/land polarity conversion for a groove/land track change determined on an optical medium according to the present invention.

In step S830, using the initial physical identification value, the specific physical identification value, and the first value to calculate a number different of sectors laid from the respective specific sector to approach a reference groove/land changing point, along the track where the specific sector belongs, wherein the number difference of sectors per calculation based on a predetermined cycle is set to be a second value as a remainder value (as a reference "R" shown in FIG. 6e) of using the first value to divide a number difference of sectors laid between the specific physical identification value and the initial physical identification value (i.e. R=MOD ((P−N), m));

In step S840, comparing the first value with the second value per calculation to determine whether the second value is identical with a difference value of subtracting one sector from the first value (i.e. "R=m−1" as shown in FIG. 6e), or with a PID value of a aftermost sector at en end of the track; if so, performing a step S850; and otherwise, performing a step S855;

In step S850, when the second value is identical with the difference value of subtracting one sector from the first value, it means that a specific sector relative to the second value (as a reference "m−1" of FIG. 6e) is as an aftermost sector arranged at an end of a track wherein the first specific sector is located and neighboring on a subsequent groove/land changing point (as a numerical reference 66 of FIG. 6a) on the optical medium, determining the subsequent groove/land changing point at a header area of a next track of the optical medium for converting a groove/land polarity (as a numerical reference 68 shown in FIG. 6e) in response to the groove/land track change (as a numerical reference 66 shown in FIG. 6a), and resetting the second value to zero (i.e. R=0);

In step S855, continuously and individually setting (e.g. detecting and marking) each of the next sequent sectors (i.e. a reference "$K_1$" shown in FIG. 6a) adjacent to the specific sector (as a reference "K" shown in FIG. 6a) to approach the subsequent groove/land changing point, and determining whether the new specific sector (as the reference "$K_1$") is decoded successfully to achieve the corresponding physical identification data (as a reference "$P_1$" shown in FIG. 6d) or not; if so, further returning to the loop from the steps S820 to S850 to determine the corresponding second value (as a reference "$R_1$" shown in FIG. 6e), whereby each of the other oncoming groove/land changing points distributed on the optical medium can be sequentially found, by re-performing a loop from the steps S820 to S855;

In step S860, as long as the next sector (as the reference "$K_1$" shown in FIG. 7a) fails to be decoded successfully, calculating the corresponding second value (as a reference "R+1" shown in FIG. 7e) relative to the decoded-fail specific sector by adding one to a previous second value (as a reference "R" shown in FIG. 7e), and then returning to the step S840 until a sequent sector relative to the second value approaches or neighbors on the subsequent groove/land changing point (as the numerical reference 76 shown in FIG. 7a).

In conclusion, the track-polarity converting apparatus and method according to the embodiments of the present invention are capable of initially seeking a reference groove/land changing point or utilizing any one decoded PID of a sector laid on an optical medium to accurately determine each subsequent groove/land changing point distributed on the optical medium for timely converting a groove/land polarity. Therefore, the apparatus and method of the present invention can accurately implements a recording/reading process on the optical medium, especially for one kind of optical medium, i.e. DVD-RAM, which must use exact groove/land information to perform a tracking control. Also, the present invention does not need to successively check the physical identification data (PID) of most of the last sectors in a track as the aforementioned prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An apparatus for converting a groove/land polarity upon a groove/land track change on an optical medium, comprising:

a groove/land detector determining a first groove/land changing point on a zone laid on the optical medium;

a sector information unit providing a first value indicating a total number of sectors per track according to the zone of the optical medium;

a sector counter counting a number of sectors, from the first groove/land changing point to approach a second groove/land changing point, along the track of the optical medium, wherein the number of sectors per count is set to be a second value; and a comparing unit comparing the first value with the second value to determine the second groove/land changing point for performing the groove/land polarity conversion when the first value is identical with the second value.

2. The apparatus as described in claim 1 wherein the groove/land detector seeks the first groove/land changing point based on a phase difference of an envelope signal.

3. The apparatus as described in claim 1 wherein the sector information unit provides sector information relative to the optical medium.

4. The apparatus as described in claim 3 wherein the sector information unit has a built-in lookup table.

5. The apparatus as described in claim 1 wherein the sector information unit serves to calculate a total number of sectors per track according to each different zone of the optical medium.

6. The apparatus as described in claim 1 wherein the sector counter counts the number of sectors by adding one sector to the previous second value to output the second value.

7. The apparatus as described in claim 1 wherein the sector counter counts the number of sectors at a predetermined cycle derived from a phase-locked loop circuit.

8. The apparatus as described in claim 1 wherein the comparing unit generates an enabling signal when the first value is identical with the second value.

9. The apparatus as described in claim 8 further comprising a groove/land toggling unit for toggling the groove/land polarity in response to the second groove/land changing point based on the enabling signal.

10. The apparatus as described in claim 1 wherein after the second groove/land changing point is determined for converting the groove/land polarity, the second value output from the sector counter is set to zero and then re-generated until the other groove/land changing point is determined on the optical medium.

11. The apparatus as described in claim 1 wherein if the first value is not identical with the second value, the sector counter continues to count the number of sectors to output the second value until the first value is identical with the second value to determine the second groove/land changing point on the optical medium.

12. A method for converting a groove/land polarity upon a groove/land track change on an optical medium, comprising the steps of:
    detecting a first groove/land changing point formed in a zone laid on the optical medium;
    generating a first value indicating a total number of sectors per track according to said zone of the optical medium;
    generating a second value by counting a number of sectors from the first groove/land changing point to approach a second groove/land changing point, along the track of the optical medium; and
    comparing the first value with the second value to determine the second groove/land changing point on the optical medium thereby toggling the groove/land polarity when the first value is identical with the second value.

13. The method as described in claim 12 further comprising a step of: determining the first groove/land changing point based on a phase difference of an envelope signal.

14. The method as described in claim 12 further comprising a step of: counting the number of sectors to generate the second value by adding one sector to the previous second value.

15. The method as described in claim 12 further comprising a step of: generating a groove/land converting signal for toggling the groove/land polarity when the first value is identical with the second value.

16. The method as described in claim 12 further comprising a step of: as soon as the second groove/land changing point is determined for toggling the groove/land polarity, setting the second value to zero and then re-generating the second value by counting the number of sectors until the other oncoming groove/land changing points are determined one by one.

17. The method as described in claim 12 further comprising a step of: when the first value is not identical with the second value, continuously counting the number of sectors to re-generate the second value until the first value is identical with the second value to determine the second groove/land changing point.

18. An apparatus for converting a groove/land polarity upon a groove/land track change on an optical medium, comprising:
    a physical identification data decoder decoding a specific physical identification value indicating a physical layout of at least one specific sector laid on the optical medium;
    a sector information and calculation unit based on the specific physical identification value, determining a first value indicating a total number of sectors per track, and a number difference of sectors laid from the respective specific sector to approach a reference groove/land changing point laid on a track where the specific sector belongs, wherein the number difference of sectors per calculation is set to be a second value;
    a calculator counting the second value generated from the sector information and calculation unit if the physical identification data decoder fails to decode the specific physical identification value of the specific sector relative to the second value, and otherwise directly reloading the second value generated from the sector information and calculation unit; and
    a comparing unit comparing the first value with the second value per calculation to determine a subsequent groove/land changing point neighboring to the specific sector with regard to the second value for converting the groove/land polarity.

19. The apparatus as described in claim 18 wherein the sector information and calculation unit has a built-in lookup table that predefines a physical relationship among sectors, tracks and zones laid on the optical medium so as to determine an initial physical identification value representing a foremost sector and the first value indicating the total number of sectors per track, with reference to the zone where the specific sector belongs.

20. The apparatus as described in claim 18 wherein the sector information and calculation unit serves to calculate the first value indicating the total number of sectors per track according to the zone where the specific sector belongs.

21. The apparatus as described in claim 19 wherein the sector information and calculation unit further has a calculator which uses the initial physical identification value, the specific physical identification value, and the first value to calculate the number difference of sectors laid from the respective specific sector to approach the reference groove/land changing point laid on a track where the specific sector belongs, wherein the number difference of sectors per calculation is set to be the second value.

22. The apparatus as described in claim 21 wherein the number difference of sectors laid from the respective specific sector to approach the reference groove/land changing point is a remainder generated by using the first value to divide the number difference of sectors laid between the specific physical identification value and the initial physical identification value.

23. The apparatus as described in claim 18 wherein the reference groove/land changing point is in a header of a prima sector laid on the track where the specific sector belongs.

24. The apparatus as described in claim 18 wherein the comparing unit generates an enabling signal when the second value is identical with a difference value of subtracting one from the first value.

25. The apparatus as described in claim 24 further comprising a groove/land toggling unit based on the enabling signal to toggle the groove/land polarity.

26. The apparatus as described in claim 24 wherein if the second value is identical with the difference value of subtracting one from the first value, the subsequent groove/land changing point on the optical medium is determined for converting the groove/land polarity and resetting the second value to zero.

27. A method for converting a groove/land polarity upon a groove/land track change on an optical medium, comprising the steps of:
   decoding a specific physical identification value indicating a physical layout of at least one specific sector laid on the optical medium;
   determining a first value indicating a total number of sectors per track, with reference to the specific physical identification value;
   calculating a number difference of sectors laid from the respective specific sector to approach a reference groove/land changing point laid on a track where the specific sector belongs, wherein the number difference of sectors per calculation is set to be a second value; and
   determining a subsequent groove/land changing point formed on the optical medium for converting the groove/land polarity, based on a comparison between the first and second values.

28. The method as described in claim 27 further comprising a step of:
   determining an initial physical identification value representing a foremost sector on a zone where the specific sector belongs, and the first value indicating the total number of sectors per track with reference to the zone; and
   according to the initial physical identification value, the specific initial physical identification value and the first value, calculating the number difference of sectors laid from the respective specific sector to approach the reference groove/land changing point laid on the track where the specific sector belongs.

29. The method as described in claim 28 further comprising of a step of: determining the initial physical identification value and the first value by using the specific physical identification value to look up a table that predefines a physical relationship among sectors, tracks and zones laid on the optical medium.

30. The method as described in claim 28 further comprising a step of calculating the first value indicative to the total number of sectors per track according to the zone where the specific sector belongs.

31. The method as described in claim 28 wherein the number difference of sectors laid from the respective specific sector to approach the reference groove/land changing point is as a remainder by using the first value to divide the number difference of sectors between the specific physical identification value and the initial physical identification value.

32. The method as described in claim 27 further comprising a step of: if the second value is identical with a difference value of subtracting one sector from the first value, determining the subsequent groove/land changing point for converting the groove/land polarity and resetting the second value to zero.

33. The method as described in claim 27 further comprising a step of: after the subsequent groove/land changing point is determined for converting the groove/land polarity, continuously decoding a sequent sector adjacent to the specific sector until each of the other subsequent groove/land changing points is found out one by one.

34. The method as described in claim 27 further comprising a step of: after the second value is compared with a difference value of subtracting one from the first value, continuously detecting the other sequent sector adjacent to the specific sector to approach the subsequent groove/land changing point.

35. The method as described in claim 27 further comprising a step of: if the physical identification value of the specific sector fails to be decoded, re-generating the new second value by adding one to the previous second value and comparing the new second value with a difference value of subtracting one from the first value, until the subsequent groove/land changing point is approached.

36. An apparatus for converting a groove/land polarity upon a groove/land track change on an optical medium, comprising:
   a groove/land detector determining a first groove/land changing point on the optical medium;
   a sector information unit providing a first value indicating a total number of sectors on a track;
   a sector counter counting a number of sectors along the track between the first groove/land changing point and a second groove/land changing point, wherein the number of sectors after counted is set to be a second value; and
   a comparing unit comparing the first value with the second value, and determining the second groove/land changing point to converse the groove/land polarity when the first value is identical with the second value.

* * * * *

UNITED STATES PATENT AND TRADEMARK OFFICE
CERTIFICATE OF CORRECTION

| | |
|---|---|
| PATENT NO. | : 7,613,087 B2 |
| APPLICATION NO. | : 11/398512 |
| DATED | : November 3, 2009 |
| INVENTOR(S) | : Meng-hsueh Lin |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Nineteenth Day of October, 2010

David J. Kappos
*Director of the United States Patent and Trademark Office*